Feb. 7, 1939.  R. P. PRICE  2,146,442

MEASURING APPARATUS

Filed June 25, 1936  4 Sheets-Sheet 1

INVENTOR
Richard P. Price
BY E. C. Sanborn
ATTORNEY

Feb. 7, 1939.   R. P. PRICE   2,146,442
MEASURING APPARATUS
Filed June 25, 1936   4 Sheets-Sheet 2

INVENTOR
Richard P. Price
BY E. C. Sanborn
ATTORNEY

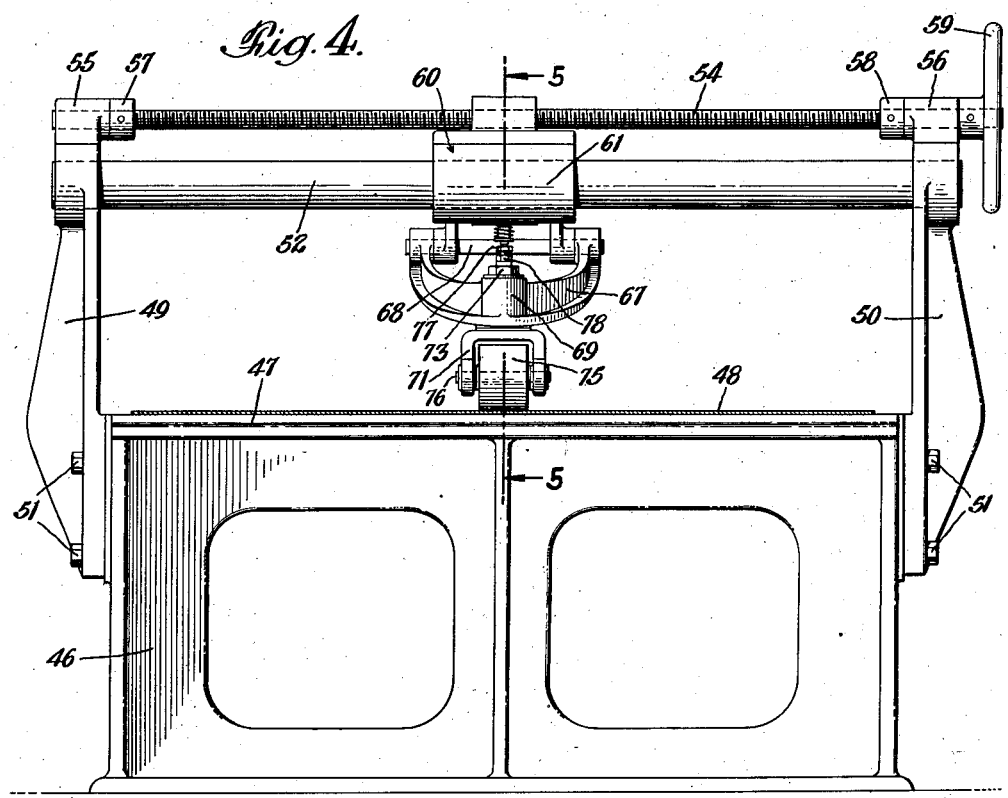

Feb. 7, 1939. R. P. PRICE 2,146,442
MEASURING APPARATUS
Filed June 25, 1936 4 Sheets-Sheet 4
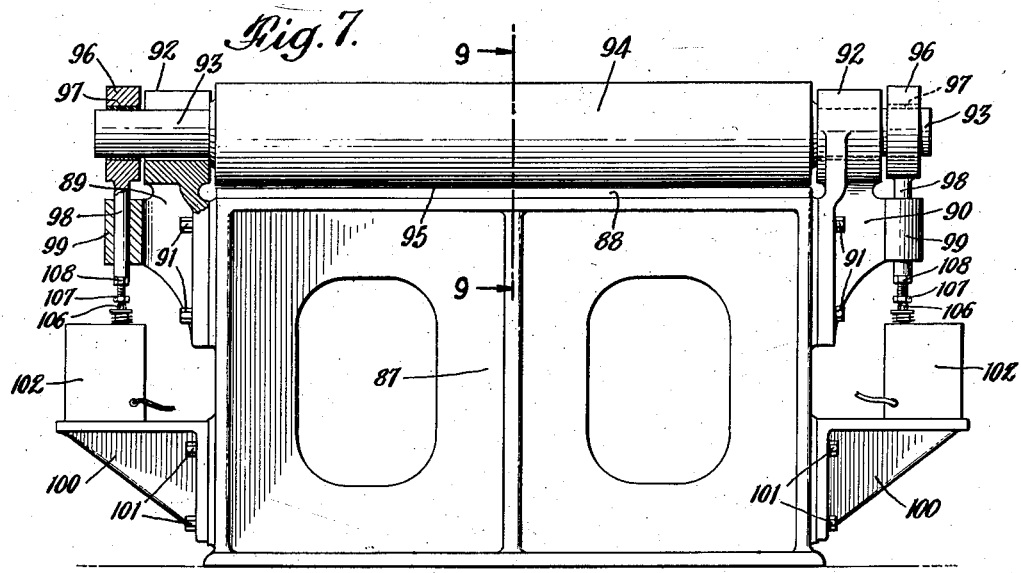
INVENTOR
Richard P. Price
BY E. C. Sanborn
ATTORNEY Patented Feb. 7, 1939

2,146,442

UNITED STATES PATENT OFFICE 2,146,442

MEASURING APPARATUS

Richard P. Price, Erie, Pa., assignor to Hammermill Paper Company, Erie, Pa., a corporation of Pennsylvania Application June 25, 1936, Serial No. 87,253

5 Claims. (Cl. 33—147)

This invention relates to apparatus for measuring the thickness of a sheet of material and more particularly to the measurement of such a sheet while it is being treated in a machine. It is very desirable to accurately measure the thickness of a sheet of material while it is being treated without stopping the movement of the sheet or interfering with the treatment thereof. For example, in the art of making paper it is frequently desirable to obtain an accurate measurement of the thickness of a paper sheet while it is in the process of manufacture and without stopping or interfering with the operation of the paper making machine.

An object of my invention is to enable the calipering of sheeted material without interfering with the operation of the machine handling the material.

A further object is to provide an accurate measuring apparatus which is capable of being calibrated either while a machine to which it is applied is stopped or running, and which is also capable of calipering a sheet of material under either of these conditions while the sheet is in the machine.

Another object is to provide apparatus for accomplishing the foregoing objects in a simple and practical manner, which may be readily applied to existing machines for treating sheet material.

Another object is to provide apparatus for accurately measuring the thickness of any desired section of a sheet of material while such sheet is passing through a machine and without interfering with the operation thereof.

Further objects and advantages will be more apparent from a description of the embodiments of the invention illustrated in the drawings, in which Figure 1 is a side elevation of one end of the two lowermost calendering rolls in a paper making machine having a measuring device applied thereto.

Figure 3 illustrates a high frequency electrical circuit which can be employed for amplifying and indicating measurements made in accordance with my invention.

Figure 4 is a front elevation of a modification of my invention with the sheet to be measured illustrated in section.

Figure 5 is a vertical section of this apparatus taken on about the line 5—5 of Fig. 4.

Figure 6 is a view similar to Fig. 5 but illustrating another form of measuring device suitable for use in the apparatus of Fig. 4.

Figure 7 is a front elevation, partly in section, of a further modification of my invention.

Figure 8 is a left end elevation of the apparatus shown in Fig. 7, and

Figure 9 is a detail sectional view on an enlarged scale taken on about the line 9—9 of Fig. 7.

Figure 1:
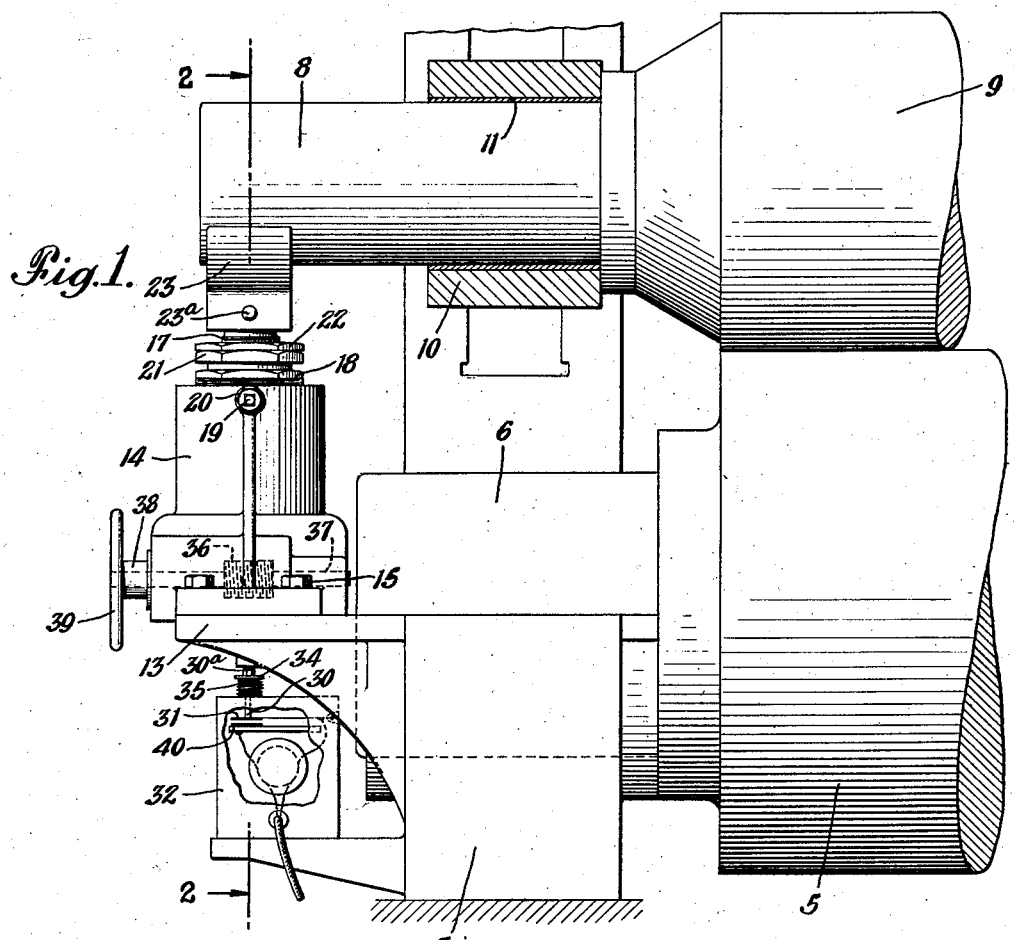
Figure 2:
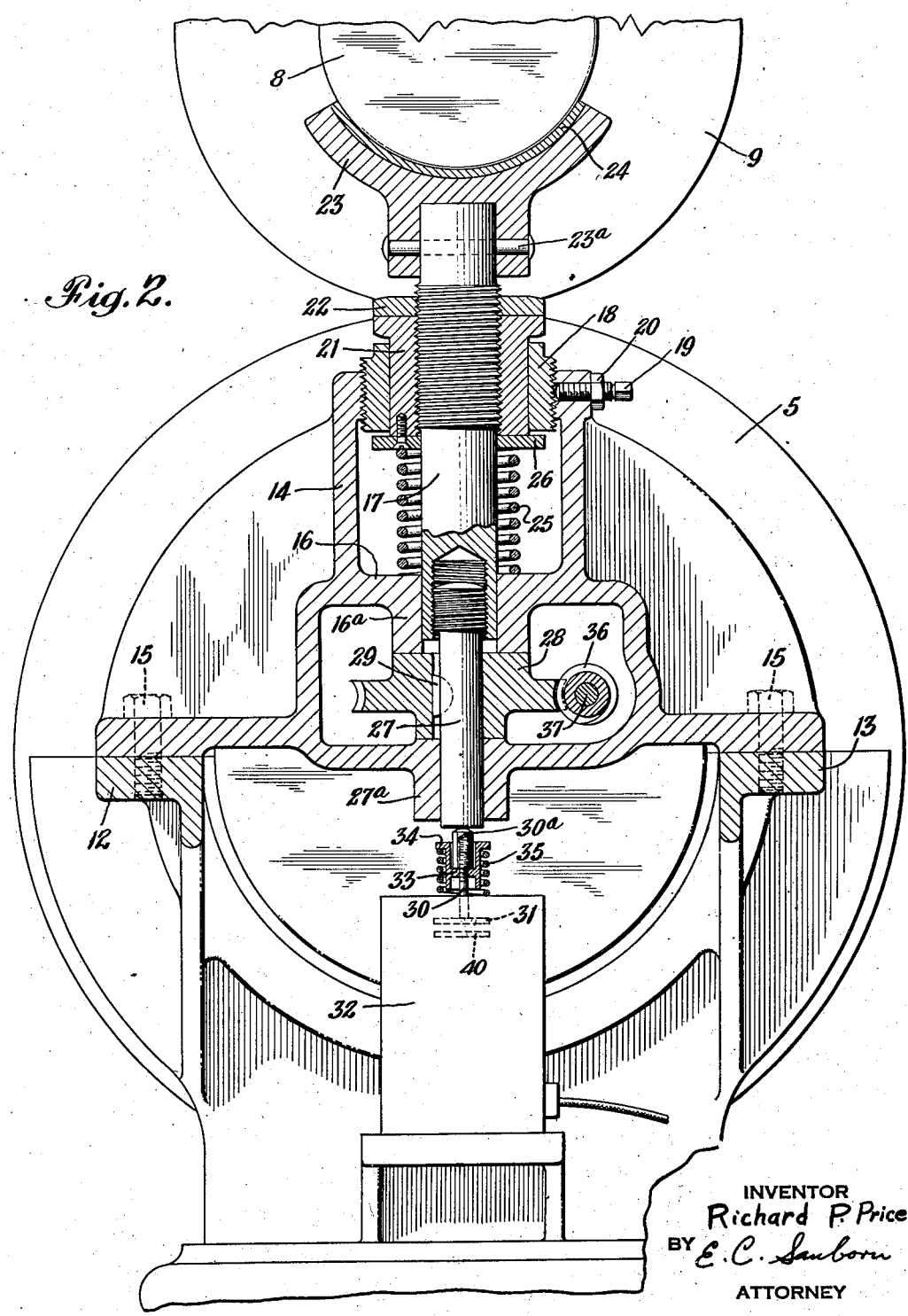
Figure 2 is a vertical section of the calipering apparatus shown in Fig. 1, with parts of the apparatus shown in elevation, and taken generally on the line 2—2 of Figure 1.

With reference to the drawings, and more particularly Figs. 1 to 3, numeral 5 indicates one end of the lowest roll of a stack of calendering rolls in a paper making machine. The journal 6 of this roll 5 may be suitably supported in a journal housing 7 provided with a suitable bearing lining. The corresponding journal 8 of the next highest calender roll 9 may be mounted in a suitable vertically movable bearing 10 provided with a bearing sleeve 11. This roll 9 runs upon roll 5 and during operation is separated therefrom only by the paper being calendered. Mounted on projecting arms 12, 13 of the housing 7 is a housing section 14 held firmly in place by suitable means such as bolts 15.

Housing section 14 is generally cylindrical in shape and provided with an integral shelf 16 having a guideway 16a for guiding the lower portion of a plunger 17. Threaded into an opening in the top portion of housing section 14 is a collar 18 held in place by a set screw 19 and lock nut 20. The inner wall of this collar 18 provides a bearing guide for collar 21 threaded on plunger 17 and held against rotation by the lock nut 22. The upper end of plunger 17 is connected to a shoe 23 by a pin 23a or other suitable means. This shoe 23 has an arcuate lining 24 of suitable bearing metal which is held firmly against the end of journal 8 by means of the spring 25. Spring 25 is compressed between the shelf 16 of the housing section 14 and a plate 26 fixed to the collar 21. Plate 26 is so positioned that it is adapted to limit upward movement of plunger 17 and collar 21 by striking the collar 18.

The lower end of plunger 17 is preferably internally threaded and the upper end of a tappet 27, which is similarly threaded, is secured within this opening in the plunger 17. This tappet 27 is arranged to move vertically in the bearing guideway 27a formed integrally with housing section 14. A suitable gear 28, mounted for rotation within the portion of housing section 14 between guideway 16a and guideway 27a, may be keyed to tappet 27 by means of a key 29. The lower end of this tappet projects down through the guideway 27a and bears against the head 30a of a pin 30 which is fixed to an upper and movable condenser plate 31. Pin 30 is preferably arranged to slide vertically through the upper wall of housing 32, and has its upper end threaded through the partition 33 in the member 34 and into the nut 30a forming the head of pin 30. A spring 35 may serve to hold the rounded upper surface of head 30a against the lower end of tappet 27.

Gear 28 may be rotated by a suitable worm 36 fixed to the end of a shaft 37, which shaft is supported for rotation in the sleeve bearing 38. Shaft 37 may be rotated by suitable means such as the hand wheel 39.

In the operation of the apparatus it will be readily apparent that the movable condenser plate 31 will be moved with respect to a condenser plate 40 fixed to housing 7, a distance equal to or proportional to the thickness of a sheet of paper introduced between the calendar rolls 5 and 9. The condenser plates 31 and 40 thus form a variable condenser, the capacity of which is an exact indication of the thickness of a sheet of material between rolls 5 and 9. Other suitable arrangements of movable and stationary plates may be employed.

As the capacity of this variable condenser is changed, this change in capacity may be amplified by the high frequency circuits shown in Fig. 3 and indicated by the micro-ammeter 41.

This amplifier circuit may receive current directly from the transformer 42 connected to the main lines 43, 43 supplying 110 volt A. C. current. The filaments of the two vacuum tubes 44, 45 receive electric energy from two portions of such a transformer and a third section thereof, taking the place of "B" batteries, may supply current to the remainder of the circuit. An amplifying circuit of this type for measuring the capacity of a variable condenser is well understood in the art and need not be explained in detail. Other means for measuring and/or amplifying movement of pin 30 with respect to housing 7 may also be provided within the scope of my invention.

Shoe 23 is continuously held against the end of journal 8 by the pressure of spring 25 in order to transmit the smallest movement of the end of the journal 8 to pin 30. The pressure of shoe 23, however, should not be sufficient to influence the weight of the calendering roll 9 or affect its calendering action. In case of variable thicknesses of paper or substantial movement of the journal 8 in a vertical direction, plate 26 serves as a stop to prevent more than a very limited upward movement of tappet 27 and pin 30. By adjusting collar 18, the gap between this collar and plate 26 may be set for any given value.

By rotating the gear 28, fine adjustments in the total length of plunger 17, tappet 27, and pin 30 may be made for calibrating the measuring apparatus either while the calendering rolls are stationary or while they are rotating without any material between them. In this manner variations caused by thin films of oil, dirt, expansion, contraction, and other variable factors are overcome and an accurate measurement may be obtained.

In calibrating this apparatus, allowance may also be made for the compressibility of the sheet to be measured. Where the same kind of material is to be measured in an apparatus, the necessary correction factor may be readily obtained by measuring the thickness of the sheet when it is compressed between two rolls and measuring the thickness of the sheet at the same place after it has emerged from between the rolls.

The apparatus in Figs. 4 to 6 is designed to accurately measure the thickness of any desired section of a sheet of material without interrupting the travel thereof. This modification may comprise a base member 46 having an upper surface 47 of arcuate cross-section for supporting the traveling sheet of material 48. A pair of upward extending arms 49, 50 are preferably firmly attached to the ends of base member 46 as by bolts 51. The arms 49 and 50 provide supports for a pair of fixed guide rods 52, 53 and also for the threaded rod 54. Threaded rod 54 may have its ends rotatably mounted in bearing portions 55 and 56 of arms 49 and 50 and is preferably restrained from longitudinal movement by the collars 57, 58 fixed to the rod adjacent these bearing portions. Hand wheel 59 or other suitable means may be employed to rotate rod 54.

A carriage 60 having two sleeves 61 and 62 is supported in sliding engagement by the rods 52 and 53 to carry the measuring apparatus. An internally threaded sleeve, formed integrally with carriage 60 may be employed to receive the threaded rod 54 for adjusting the position of the carriage in accordance with the rotation of hand wheel 59 and rod 54. A housing 63, similar to housing 32, may be carried by the carriage, in which is mounted the fixed condenser plate 64. A movable condenser plate 65 may be attached to a pin 66, the head of which is resiliently pressed against a tappet in the manner described in connection with pin 30 and plate 31 in Fig. 2.

Figures 5 and 6 illustrate different means for moving pin 66 and condenser plate 65 in accordance with the thickness of sheet 48 to be measured. In the device of Fig. 5 a yoke 67 is pivotally connected to depending portions of the carriage 60 as by pin 68. The lower end 69 of arm 67 comprises a bearing sleeve for receiving the shaft portion 70 of fork 71. This shaft 70 is provided with an integral collar 72 having an upper bearing surface adapted to bear against the lower surface of sleeve 69 and the upper end of shaft 70 may be secured in the sleeve against accidental removal by a nut 73 and washer 74. The arms of fork 71 rotatably support the roller 75 on the pin 76 for travel on the sheet 48 and vertical movement of this roller 75 is transmitted through shaft 70 to the pin 66 and condenser plate 65 by means of the bolt 77 adjustably secured in the end of shaft 70 and retained in place by the lock nut 78.

In the operation of this embodiment of my invention which may be located at the slitter board of a cutter in a paper handling machine, the condenser plates 64 and 65 make up a variable condenser to which an indicating apparatus such as shown in Fig. 3 may be connected. Vertical movement of roller 75 about the pivot 68 is accurately translated to the movable condenser plate 65 through shaft 70, bolt 77 and pin 66. Interpolation of the reading for the capacity of the condenser formed by plates 64 and 65 will thus give a direct indication of the thickness of the section of sheet 48 under roller 75 at any given time. If the thickness of some other section of the sheet 48 is to be checked, the hand wheel 59 and rod 54 may be rotated to move carriage 60 in the proper direction. The swivel or castor like connection of roller 75 to carriage 60, allows this roller to trail along over the sheet without friction and without injury thereto.

In Figure 6, a possible substitute for the roller 75 is illustrated in which the carriage 60 is provided with a depending portion 79 having a sleeve 80 formed integral therewith. A shoe 81 is pivotally attached to the portion 79 by means of the pin 82, and is provided with a contact portion 83 which may have a curved lower surface of hemi-spherical or similar shape adapted to slide easily over the surface of the sheet 48. A tappet 84 in contact with the upper surface of shoe 81 is arranged to slide vertically in the sleeve 80 and has a bolt 85 fixed to its upper end and adjustably held by a locknut 86 for contacting and moving pin 66 in accordance with the thickness of sheet 48. The operation of this embodiment is substantially the same as described above in connection with Figs. 4 and 5. The shoe, however, may be advantageous for some purposes wherein very accurate measurements are desired and it is difficult to obtain a roller of uniform radius.

Figures 7 to 9 illustrate a further modification of my invention as applied to a slitter board. A base member 87 having a curved upper surface 88 similar to the base 46 may be readily employed in this connection. Bearing guides 89 and 90 may be firmly anchored to the sides of the base 87 as by bolts 91. These bearing guides are each provided with spaced upward extending jaws 92 forming vertical guideways for the journals 93 of roll 94. Roll 94 is thus arranged to rotate on the moving sheet 95 to be calipered. Bearing collars 96, 96 having bearing sleeves 97 surround the ends of journals 93 and have integral depending shanks 98, 98 arranged to slide vertically in the sleeves 99, 99 formed integral with the bearing guides 89 and 90.

A pair of supports 100, 100 are affixed by bolts 101 to the ends of the base 87 below the bearing guides and support the housings 102, 102. Each of these housings includes a fixed condenser plate 103 and a movable condenser plate 104 carried on a pin 105. These pins 105 are constructed and arranged like the pins 30 and 66 and have heads 106 contacting the bolts 107 fixed in the lower ends of shanks 98 by lock nuts 108.

Suitable indicating apparatus such as shown in Fig. 3 may be employed to measure the capacity of the variable condenser formed by plates 103 and 104. In the operation of this device, the roll 94 contacts the sheet 95 throughout substantially its full width. The readings obtained at each end of the roll indicate any variation in thickness as well as the actual thickness of the sheet near each edge. If both readings coincide, the sheet is of substantially uniform thickness throughout. If the readings differ, however, the average thereof indicates average thickness of the sheet, and the degree of difference in the readings indicates the degree of variation in thickness in different sections of the sheet.

As previously mentioned, any suitable means, electrical, mechanical, or hydraulic, may be provided for measuring and/or amplifying the movement of pins 30, 66, and/or 105. For example, a series of mechanical levers might be employed for this purpose, or a plurality of different sized diaphragms may be used for hydraulic multiplication. An optical lever, or a partially masked photo-electric cell might also be employed for this purpose. Electrical equipment, however, is as sensitive and simple as can be provided and I, therefore, prefer to employ an electrical amplification and indicating system. The system illustrated in Fig. 3 is satisfactory. Another very suitable arrangement is to substitute a movable armature for the movable condenser plate, and two fixed fields for the fixed plate. Electrical connection may be used to measure changes in reluctance produced by movement of the armature between the two fixed fields.

Varying thicknesses of paper may be continuously measured and indicated while the paper making machine is in operation and, if desired, suitable recording mechanism, such as a potentiometer-recorder, may be used in combination with the measuring and indicating means.

Although the embodiment of my invention illustrated has been described in connection with the calendering and slitting stations of a paper making machine, it is manifest that the invention may be practiced with other portions of a paper making machine, or with any pair of shoes, rolls or other members adapted to be separated only by the thickness of the sheet of material being treated.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus for measuring the thickness of a sheet of material, a journal housing, a roll having a journal mounted for rotation in said housing, a second roll supported for vertical movement with respect to said first roll, a member, means held against a portion of said second roll for suspending said member, means for varying the length of said suspending means, and means for measuring the amount of movement of said member.

2. In apparatus for measuring the thickness of a sheet of material, a journal housing, a roll having a journal mounted for rotation in said housing, a second roll having a journal and supported for vertical movement with respect to said first roll, a shoe, a member, means connected to said member for urging said shoe against the journal of the second roll, and means for measuring movement of said member.

3. In apparatus for measuring the thickness of a sheet of material, a journal housing, a roll having a journal mounted for rotation in said housing, a second roll supported for vertical movement with respect to said first roll, a shoe, a plunger mounted for vertical movement in said housing and connected to said shoe, means for urging said shoe against a portion of the second roll, a member connected to said plunger, and means for indicating the extent of movement of said member.

4. In apparatus for measuring the thickness of a sheet of material, a journal housing, a roll having a journal mounted for rotation in said housing, a second roll supported for vertical movement with respect to said first roll, a shoe, a plunger mounted for vertical movement in said housing and connected to said shoe, means for urging said shoe against a portion of the second roll, a member connected to said plunger, means for adjusting said member with respect to said plunger, and means for indicating the extent of movement of said member.

5. In apparatus for measuring the thickness of a sheet of material, a journal housing, a roll having a journal mounted for rotation in said housing, a second roll supported for vertical movement with respect to said first roll, a member fixed to said housing, a shoe adapted to engage the journal of the second roll, a plunger connected to said shoe and mounted for vertical movement in said housing, a second member, adjustable means connecting said second member to the plunger, and means for indicating variations in the distance between said members.

RICHARD P. PRICE.